United States Patent
Mehrhoff et al.

(10) Patent No.: US 11,074,642 B2
(45) Date of Patent: Jul. 27, 2021

(54) SYSTEM, COMPUTER-READABLE MEDIA AND COMPUTER-IMPLEMENTED METHOD FOR AUTOMATED LOCATION INTERACTION MANAGEMENT

(71) Applicant: Mastercard International Incorporated, Purchase, NY (US)

(72) Inventors: Shawn Mehrhoff, Saint Ann, MO (US); Christopher T. Scholl, Saint Peter's, MO (US)

(73) Assignee: Mastercard International Incorporated, Purchase, NY (US)

( * ) Notice: Subject to any disclaimer, the term of this patent is extended or adjusted under 35 U.S.C. 154(b) by 359 days.

(21) Appl. No.: 15/955,949

(22) Filed: Apr. 18, 2018

(65) Prior Publication Data

US 2019/0325505 A1    Oct. 24, 2019

(51) Int. Cl.
*G06Q 30/00* (2012.01)
*G06Q 30/06* (2012.01)
*H04W 4/02* (2018.01)

(52) U.S. Cl.
CPC ..... *G06Q 30/0639* (2013.01); *G06Q 30/0633* (2013.01); *H04W 4/023* (2013.01)

(58) Field of Classification Search
CPC .................................................... G06Q 30/00
See application file for complete search history.

(56) References Cited

U.S. PATENT DOCUMENTS

| | | | |
|---|---|---|---|
| 7,427,023 B2 | 9/2008 | Suenbuel | |
| 8,219,115 B1* | 7/2012 | Nelissen | H04W 4/021 455/456.3 |
| 2003/0225589 A1* | 12/2003 | Eaton | G06Q 30/0239 709/207 |
| 2006/0265294 A1* | 11/2006 | de Sylva | G06Q 30/0603 705/28 |
| 2007/0129888 A1* | 6/2007 | Rosenberg | G01C 21/20 701/433 |
| 2007/0214061 A1 | 9/2007 | Toyokawa et al. | |
| 2012/0100869 A1 | 4/2012 | Liang et al. | |
| 2012/0158545 A1* | 6/2012 | Chen | G06Q 30/0623 705/26.61 |
| 2013/0046602 A1 | 2/2013 | Grigg et al. | |
| 2013/0253882 A1 | 9/2013 | Park | |
| 2014/0297414 A1 | 10/2014 | Zhao et al. | |
| 2015/0019354 A1* | 1/2015 | Chan | A47J 37/00 705/15 |
| 2015/0379531 A1* | 12/2015 | Christian | G06Q 30/0202 705/7.31 |

(Continued)

OTHER PUBLICATIONS

Miles, Stephanie, "8 tools to send messages to shoppers based on in-store movements", Streetfightmag.com, dated Apr. 21, 2014. (Year: 2014).*

*Primary Examiner* — Mark A Fadok
(74) *Attorney, Agent, or Firm* — Hovey Williams LLP

(57) ABSTRACT

A system, computer-readable media and computer-implemented method for automated location interaction management. User input at least partly defining an item is received and stored via a mobile electronic device. A location interaction trigger for the item is automatically determined to have occurred, based at least in part on a geolocation of the mobile electronic device. An alert is generated describing the item for display on a display of the mobile electronic device.

18 Claims, 4 Drawing Sheets

(56) References Cited

U.S. PATENT DOCUMENTS

2017/0178219 A1* 6/2017 Vaidya .................. G06Q 20/34
2018/0181907 A1* 6/2018 Esmailzadeh ........ G06Q 10/083
2018/0293644 A1* 10/2018 Allen ................. G06Q 30/0633

* cited by examiner

SYSTEM, COMPUTER-READABLE MEDIA AND COMPUTER-IMPLEMENTED METHOD FOR AUTOMATED LOCATION INTERACTION MANAGEMENT

FIELD OF THE INVENTION

The present disclosure generally relates to systems, computer-readable media and computer-implemented methods for automated location interaction management via a user's mobile electronic device.

BACKGROUND

People track to-do tasks using paper or electronically-maintained lists. Typically, a person will edit a list by typing or writing in new tasks, and by crossing out or manually deleting completed tasks. In an example, a person may type a list of tasks into a list entitled "Grocery Store" via a user interface of a mobile phone, visit a grocery store to purchase listed goods, and delete one or more tasks from the list. Mobile phones may also be leveraged to share electronic copies of a list between devices and/or people.

BRIEF SUMMARY

Embodiments of the present technology relate to systems, computer-readable media and computer-implemented methods for automated location interaction management. Embodiments of the present technology provide an improved automated solution for addressing items across multiple locations. According to an embodiment, a user may also or alternatively be aided in the addressing items at a particular location through automated estimation of the user's intended departure coupled with automated item-tracking.

In a first aspect, a system for automated location interaction management may be provided. The system may comprise a mobile electronic device. The mobile electronic device may include a communication element, a memory element, a processing element which executes a software application, and one or more location-determining elements. The software application may be configured to: (1) receive and store user input at least partly defining an item; (2) automatically determine, based at least in part on a geolocation of the mobile electronic device, that an interaction trigger for the item has occurred; (3) automatically generate an alert describing the item; and (4) automatically display the alert on a display of the mobile electronic device. The system may include additional, less, or alternate functionality, including that discussed elsewhere herein.

In another aspect, a computer-implemented method for automated location interaction management may be provided. The computer-implemented method may include receiving and storing, via a mobile electronic device, user input at least partly defining an item. A location interaction trigger for the item is automatically determined to have occurred, based at least in part on a geolocation of the mobile electronic device. An alert is generated describing the item for display on a display of the mobile electronic device. The method may include additional, less, or alternate actions, including those discussed elsewhere herein.

In still another aspect, a system comprising computer-readable media for automated location interaction management may be provided. The system may include a non-transitory computer-readable medium with a program stored thereon, wherein the program instructs a hardware processing element of a mobile electronic device to: (1) receive and store user input at least partly defining an item; (2) automatically determine, based at least in part on a geolocation of the mobile electronic device, that an interaction trigger for the item has occurred; (3) automatically generate an alert describing the item; and (4) automatically display the alert on a display of the mobile electronic device. The program(s) stored on the computer-readable media may instruct the processing elements to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

DETAILED DESCRIPTION

Figure 1:
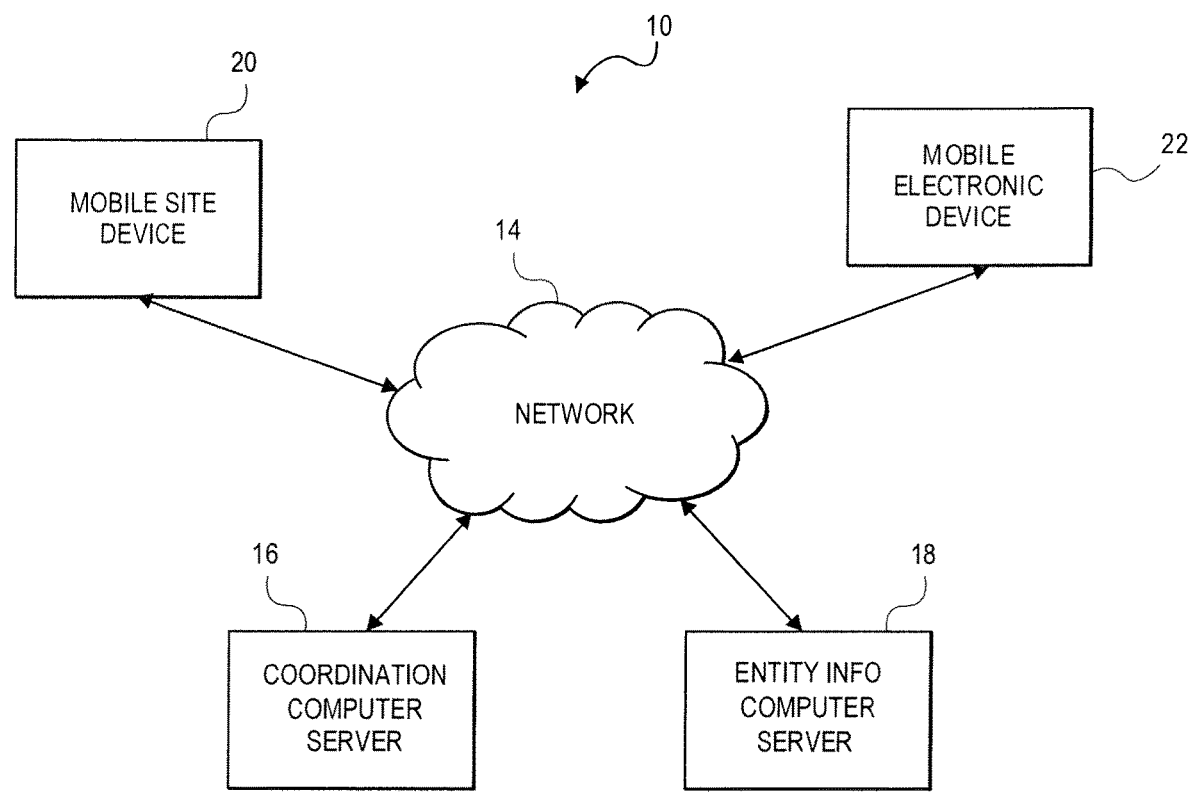
FIG. 1 illustrates an exemplary environment in which embodiments of a system may be utilized for automated location interaction management.

The present embodiments described in this patent application and other possible embodiments may relate to systems and methods for automated location interaction management. Embodiments of the present invention may be utilized to provide improved trip planning via automated reorganization of items and pre-configured ontological and/or taxonomic databases. Embodiments of the present invention may also be utilized to improve on-site task management, for example by automatically assessing a user's likely intent for egress coupled with automated item-tracking.

The present embodiments may relate to, inter alia, an item-tracking application of a user mobile device that manages a user's interactions with locations that offer products and/or activities. Such locations may include merchant storefronts, restaurants, gas stations, parks, food trucks, and any other location offering products and/or activities, as described in more detail below. The item-tracking application may access a robust ontological framework to automatically and dynamically generate associations between items the user intends to address at one or more locations. The item-tracking application may be configured to interface with an API (see discussion below) of a remote coordination server to query PIL profiles detailing inventory and other offerings data in support of automated and dynamic association generation. The item-tracking application may be configured to automatically overlay visual elements representative of the automatically-associated items at a user interface managed by a mapping software application.

The item-tracking application may be configured to receive user feedback via the user interface, and to automatically generate a second set of associations responsive to the user input and according to a pre-determined hierarchy of precedence. The user may interact with the item-tracking application and/or otherwise act in a manner detectable by the item-tracking application, including by addressing the items in whatever manner the user desires. The item-tracking application preferably recalculates associations between the items dynamically on an intermittent and/or continuous basis based on the user actions, the ontological framework, and/or inventory data obtained via queries issued to the remote coordination server.

In an embodiment, the item-tracking application generates alerts for display at the user interface of the user mobile device. The alerts may indicate that the user is proximate to a location matching or likely matching one or more items managed by the item-tracking application. The degree of proximity required, and the triggering of an alert, may be determined at least in part using a trigger algorithm of the item-tracking application. The trigger algorithm may automatically calculate a geofence for use in determining sufficient proximity to trigger an alert, and may take into account the proportion of matching items, item availability density(ies), PIL-type availability density(ies), and the like, as discussed in more detail below.

The present embodiments may also relate to, inter alia, automated processes of the item-tracking application that manage the user's activities at a given location. For example, the item-tracking application may interface with a mobile shopping cart application to permit automated editing of the items to, for example, indicate completion or suspension of same. The item-tracking application may also—alone or in conjunction with the mobile shopping cart application—provide on-site navigational guidance and prompts to the user to aid in addressing the items. Moreover, the item-tracking application preferably automatically determines the user's likely egress from a location or an area of a location at which an outstanding item may be addressed, and generates an alert describing the item for display at the user interface, thereby reducing instances of inadvertent failure to address an item.

Further, the item-tracking application may incorporate one or more computer learning algorithms to improve item association(s), item data entries and/or metadata, matching to PIL offerings, ontological frameworks, and the like. The item-tracking application may be configured to utilize the computer learning algorithm to learn how the user addresses items, and to adjust location interaction management processes accordingly. In an embodiment, the computer learning algorithm may be employed to personalize automated location interaction management based on a user's language and/or behavioral patterns and/or more broadly to improve automated location interaction management using data regarding one or more users.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

Figures 4, 5:
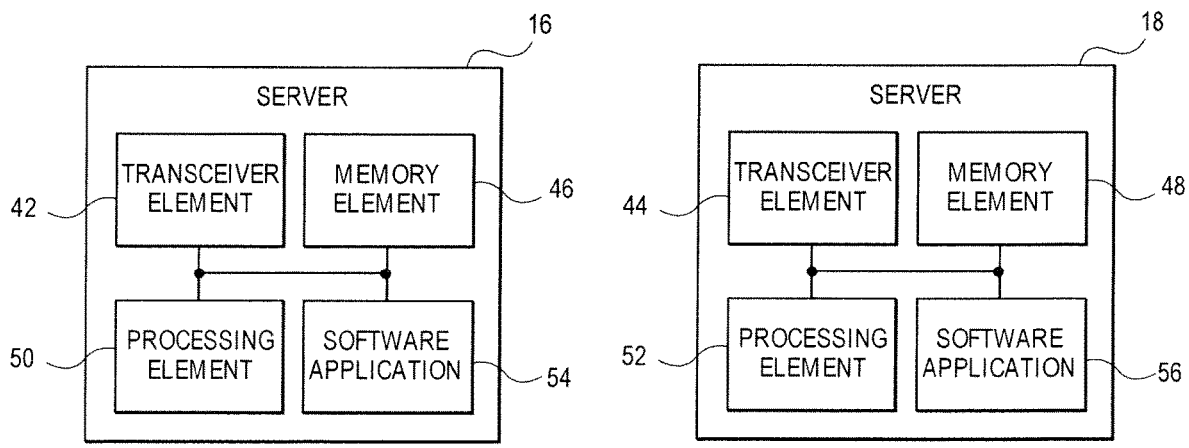
FIG. 4 illustrates various components of a coordination computer server shown in block schematic form.
FIG. 5 illustrates various components of an exemplary entity info computer server shown in block schematic form.

FIG. 1 depicts an exemplary environment in which embodiments of a system 10 may be utilized for automated location interaction management. The environment may include a network 14 and one or more computer servers 16, 18—as seen in FIGS. 1, 4 and 5—with which the system 10 interfaces to send and receive information about potential interaction locations (PILs), including products and/or activities offered at the PILs, and information from knowledge bases comprising pre-determined ontological frameworks and/or taxonomies of products and/or activities. Some PILs may be sites of generally fixed physical location defined within system 10 in connection with offerings of one or more products and/or activities. PILs may also or alternatively be variable-location sites and/or mobile potential interaction locations (MPILs).

One or more mobile site devices 20 may also be included for transmitting information to at least one of the servers 16, 18 and/or mobile electronic device(s) 22 about respective MPILs, as discussed in more detail below. Each mobile site device 20 may be assigned or configured, typically by its manufacturer, with a universally unique identifier (UUID), a 128-bit value. Each mobile site device 20 may be programmed or configured with an association to a corresponding MPIL. For instance, a mobile site device 20 UUID (or other unique identifier) may be associated with a corresponding MPIL profile (see discussion below). The mobile site device 20 may periodically and/or continuously transmit geolocation data (e.g., latitude and longitude coordinates) for the MPIL for storage in the corresponding MPIL profile.

It is foreseen that computing device(s) may also be associated with fixed-location PILs for automatically providing inventory, location and/or other profile data (see discussion below) without departing from the spirit of the present invention. One of ordinary skill will also appreciate that each PIL may be associated with a dedicated entity info computer server 18 (or other computing device performing the functions thereof as outlined herein) for collecting and providing profile data (e.g., to the coordination computer server 16 and/or a mobile electronic device 22) within the scope of the invention.

A profile may be maintained for each PIL, though it is foreseen that multiple PILs may share one or more portions of a profile without departing from the spirit of the present invention (e.g., where all locations of a chain of stores share common store hours, and the profile for each but the last store simply contains a pointer to the "store hours" portion of the profile of the last store). Each PIL profile may include: address information (and/or geolocation data); labels for the PIL such as trade name, merchant codes or the like; dates and/or times of the offerings (e.g., store hours), etc., as described in more detail below.

An appropriate database format/structure for storage of profiles may be selected based, at least in part, upon which methodology is implemented for matching profiles to items (again, as described in more detail below), and one of ordinary skill will immediately recognize that a variety of structures are within the scope of the present invention. For instance, a relational database may be selected in embodiments implementing semantic queries and/or ontological frameworks for matching purposes, though other structures (e.g., object-oriented databases, etc.) may be adopted without departing from the spirit of the present invention. In an embodiment, one or more database management system(s) may manage information of PIL profiles and/or classifications, taxonomies, ontologies, lexicons, linguistic resources and/or other knowledge bases in support of matching and other functions described herein.

An individual and/or entity that edits and/or has rights to edit at least one PIL profile may be referred to herein as a "profile owner." One of ordinary skill will appreciate that profile data may be provided and/or edited by a profile owner using any of a variety of means within the scope of the invention, for example where a profile owner periodically accesses and edits a profile using a personal computer and an authentication procedure (password, biometric, etc.). In an embodiment, a for-profit business profile owner may define a grocery store as its PIL for selling groceries and providing basic medical (clinic) services, and a city government profile owner may define a city park as its PIL for jogging, site-seeing, skateboarding and other activities. In other examples, a for-profit business profile owner may define a food truck as its MPIL for selling food of one or more types, and a non-profit organization profile owner may define a recurring event—such as a 5 k run—as its MPIL, where each installment of the recurring 5 k event takes place at a different physical location.

All or some of the information in the profiles may be provided to the coordination computer server 16 by, for example, the entity info computer server 18 via an application programming interface (API), to support automated location interaction management by the mobile electronic device 22 according to embodiments of the present invention.

The user mobile electronic device 22 may be kept near the user to enable transmitting location information about the user and carrying out other steps for automated location interaction management, as outlined in more detail below. The user mobile electronic device 22 may execute item-tracking application 24. Item-tracking application 24 may include instructions for recognizing a keyphrase to initialize the primary operations of the application 24. Operations of the application 24 may be carried out via the network 14 and/or one or more of the devices and servers 16, 18, 20. Such operations may include authenticating the user, defining a plurality of items that may be addressed at one or more PILs, generating and displaying location-based alerts for the items, and editing the items to reflect completion.

The network 14 may generally allow communication between the mobile site device 20, the mobile electronic device 22 and the servers 16, 18. Several mobile electronic devices 22 may be present in embodiments of the present invention—for example where such devices 22 coordinate in editing an item, as discussed in more detail below—and the network 14 may likewise facilitate communication therebetween. The network 14 may include local area networks, metro area networks, wide area networks, cloud networks, the Internet, cellular networks, plain old telephone service (POTS) networks, and the like, or combinations thereof. The network 14 may be wired, wireless, or combinations thereof and may include components such as modems, gateways, switches, routers, hubs, access points, repeaters, towers, and the like. The mobile site device 20 and/or the mobile electronic device 22 may generally connect to the network 14 wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth®, or combinations thereof.

Each computer server 16, 18 generally retains electronic data and may respond to requests to retrieve data as well as to store data. The computer servers 16, 18 may be embodied by application servers, database servers, file servers, gaming servers, mail servers, print servers, web servers, or the like, or combinations thereof. Furthermore, the computer servers 16, 18 may include a plurality of servers, virtual servers, or combinations thereof. The computer servers 16, 18 may also include processors, memory storage such as optical drives, hard disk drives, rack-mount drives, blade drives, and the like, and transceiver components that provide wired and/or wireless communication with the network 14.

The computer servers 16, 18 may be configured to include or execute software such as file storage applications, database applications, email or messaging applications, web server applications, or the like. The computer servers 16, 18 may apply business methods or algorithms, may utilize lookup tables or databases, or combinations thereof to receive, store and/or disseminate information relating to PILs, including products and/or activities offered at PILs, and/or users taking advantage of automated location interaction management according to embodiments of the present inventive concept. For example, the entity info computer server 18 may periodically or continuously receive, store and/or transmit location information (e.g., latitude and longitude coordinates from mobile site devices 20 and/or addresses) regarding, and/or products/activity offerings of, PILs. The entity info computer server 18 may respond to queries from and/or otherwise transmit the aforementioned and other information regarding PILs to the coordination computer server 16. The coordination computer server 16 may receive location information (e.g., latitude and longitude coordinates and/or addresses), and/or queries for PIL information, from the mobile electronic device 22. The coordination computer server 16 may also perform one or more functions of the application 24, such as comparing the location of the mobile electronic device 22 and/or one or more items against the PIL information, without departing from the spirit of the present invention.

Each of the mobile site device(s) 20 and the mobile electronic device 22 may be embodied by a smart watch or any other wearable electronic device, a smart phone, a personal digital assistant (PDA), a tablet, a palmtop or laptop computer, or another mobile device. The mobile electronic device 22 is typically carried by or otherwise kept near the user, and each mobile site device 20 is typically carried by or otherwise kept near a respective MPIL (e.g., a food truck).

Figure 2:
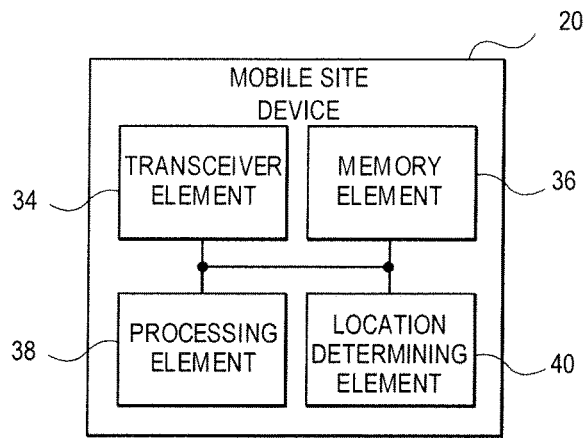
FIG. 2 illustrates various components of an exemplary mobile site device shown in block schematic form.
Figure 3:
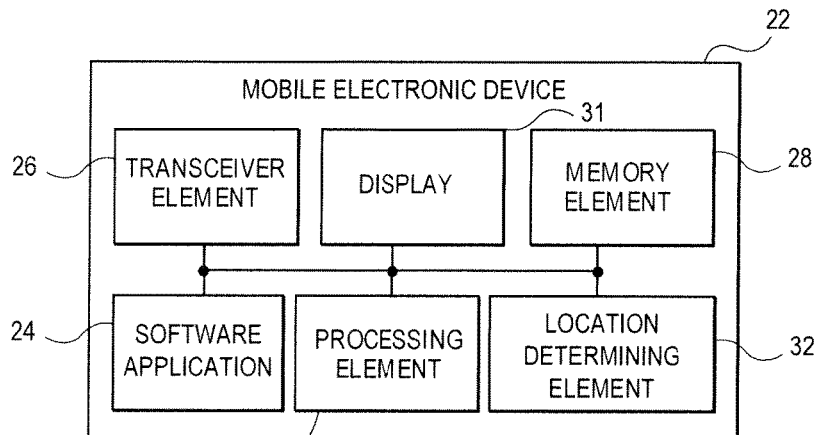
FIG. 3 illustrates various components of an exemplary mobile electronic device shown in block schematic form.

In an embodiment, the mobile electronic device 22 may include a transceiver element 26, a memory element 28, a processing element 30, a display 31 and a location determining element 32, along with item-tracking application 24, as seen in FIG. 3. The mobile site device(s) 20 may each include a transceiver element 34, a memory element 36, a processing element 38, and a location determining element 40, as seen in FIG. 2, though simpler location-tracking devices are also within the scope of the present invention.

The servers 16, 18 may respectively include transceiver elements 42, 44, memory elements 46, 48, processing elements 50, 52, and software applications 54, 56, as seen in FIGS. 4-5.

The transceiver elements 26, 34, 42, 44 may each respectively allow wireless and/or wired communication generally with external systems or devices. Each of the transceiver elements 26, 34, 42, 44 may include signal or data transmitting and receiving circuits, such as antennas, amplifiers, filters, mixers, oscillators, digital signal processors (DSPs), and the like. The transceiver elements 26, 34, 42, 44 may establish communication wirelessly by utilizing RF signals and/or data that comply with communication standards such as cellular 2G, 3G, or 4G, WiFi, WiMAX, Bluetooth®, BLE, or combinations thereof. The transceiver elements 26, 34, 42, 44 may respectively be in communication with the processing elements 30, 38, 50, 52 and the memory elements 28, 36, 46, 48.

Each of the memory elements 28, 36, 46, 48 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, one or more of the memory elements 28, 36, 46, 48 may be embedded in, or packaged in the same package as, respective ones of the processing elements 30, 38, 50, 52. Each memory element 28, 36, 46, 48 may include, or may constitute, a "computer-readable medium." The memory elements 28, 36, 46, 48 may store the instructions, code, code segments, software, firmware, programs, applications, apps, services, daemons, or the like that are executed by respective ones of the processing elements 30, 38, 50, 52.

Each of the processing elements 30, 38, 50, 52 may include processors, microprocessors (single-core and multi-core), microcontrollers, DSPs, field-programmable gate arrays (FPGAs), analog and/or digital application-specific integrated circuits (ASICs), or the like, or combinations thereof. The processing elements 30, 38, 50, 52 may generally execute, process, or run instructions, code, code segments, software, firmware, programs, applications, apps, processes, services, daemons, or the like. The processing elements 30, 38, 50, 52 may also include hardware components such as finite-state machines, sequential and combinational logic, and other electronic circuits that can perform the functions necessary for the operation of the current invention. Each of the processing elements 30, 38, 50, 52 may be in communication with the other electronic components of its respective device through serial or parallel links that include address busses, data busses, control lines, and the like.

Each of the location determining elements 32, 40 generally determines a current geolocation of the corresponding electronic device and may receive and process radio frequency (RF) signals from a global navigation satellite system (GNSS) such as the global positioning system (GPS) primarily used in the United States, the GLONASS system primarily used in regions formerly part of the Soviet Union, or the Galileo system primarily used in Europe. Each location determining element 32, 40 may accompany or include an antenna to assist in receiving the satellite signals. The antenna may be a patch antenna, a linear antenna, or any other type of antenna that may be used with location or navigation devices. Each location determining element 32, 40 may include satellite navigation receivers, processors, controllers, other computing devices, or combinations thereof, and memory. Each location determining element 32, 40 may process a signal, referred to herein as a "location signal," from one or more satellites that includes data from which geographic information such as the current geolocation is derived. The current geolocation may include coordinates, such as the latitude and longitude, of the current location of the corresponding electronic device. The location determining elements 32, 40 may respectively communicate the current geolocation to the corresponding processing element 30, 38, memory element 28, 36, or both.

Although embodiments of the location determining elements 32, 40 may include a satellite navigation receiver, it will be appreciated that other location-determining technology may be used. For example, cellular towers or any customized transmitting radio frequency towers may be used instead of satellites to determine the location of the corresponding electronic device(s) by receiving data from at least three transmitting locations and then performing basic triangulation calculations to determine the relative position of the device with respect to the transmitting locations. With such a configuration, any standard geometric triangulation algorithm may be used to determine the location of the electronic device(s). Each location determining element 32, 40 may also include or be coupled with a pedometer, accelerometer, compass, or other dead-reckoning components which allow it to determine the location of the corresponding electronic device. Each location determining element 32, 40 may determine the current geographic location through a communications network, such as by using Assisted GPS (A-GPS), or from another electronic device. The location determining elements 32, 40 may even receive location data directly from a user and/or profile owner.

In an embodiment, mobile electronic devices 22 may be configured to communicate locally with one another and with on-site devices located at PILs (such as with mobile site device(s) 20, electronic beacons such as BLUETOOTH® LE beacons and/or IBEACONS®, radio-frequency identification transmitters, or the like) to determine relative location(s) and/or exchange information regarding product(s) and/or activities offered at the PILs. Such local communication(s) may occur directly via peer-to-peer (P2P) wireless communication and/or data transfer. In still other aspects, each mobile device 22 may be configured to communicate directly and indirectly with one and/or any suitable device, which may be concurrent communications or communications occurring at separate times. To provide an example, mobile devices 22 may be configured to communicate with one another and/or with electronic beacons or the like via a direct radio link (or radio wave or radio frequency link), which may utilize, for example, a Wi-Fi direct protocol, an ad-hoc cellular communication protocol, etc. Furthermore, mobile devices 22 may be configured to communicate with such devices utilizing a BLUETOOTH communication protocol (radio link(s) not shown).

In such embodiments, relative location and/or proximity (including a device's 22 position within a geofence, as described in more detail below) may be determined without the need for determining geographic location(s) according to other methods described herein (e.g., using satellite navigation receiver, triangulation, etc.). For instance, proximity may be determined simply through detection or receipt of a data packet (see discussion below) and/or through determination of a signal strength of a transmission of an on-site device. More particularly, each on-site device may function as follows. At a frequency of, for example, 1 Hertz (Hz) to 10 Hz, the on-site device may wirelessly transmit a packet of data, which includes, at the least, information regarding a corresponding PIL. In some embodiments, the item-tracking application 24 executing on the mobile electronic device 22 may receive just a simple packet and may transmit a reply that queries the on-site device for additional information, such as the PIL location/address and/or offerings. The on-site device may comply with the request and transmit additional information required to determine the occurrence of a location interaction trigger and to take other actions in connection with automated location interaction management steps outlined in more detail elsewhere herein. In other embodiments, the initial packet of data may include substantially all such required information in its initial and/or otherwise unprompted transmission(s). In any case, the fact of receipt of such a transmission from an on-site device may indicate proximity of a mobile device 22, and/or the device 22 may determine a distance from the on-site device using signal strength, for instance.

It is therefore foreseen that embodiments may optionally bypass the servers 16, 18—in whole or in part—through direct location and profile data exchange(s) between each mobile electronic device 22 and the on-site device(s), without departing from the spirit of the present invention.

The display 31 may comprise a user interface of the mobile electronic device 22. The display 31 may include video devices of the following types: plasma, standard or ultra-high-definition light-emitting diode (LED), organic LED (OLED), quantum dot LED (QLED), Light Emitting Polymer (LEP) or Polymer LED (PLED), liquid crystal display (LCD), thin film transistor (TFT) LCD, LED side-lit or back-lit LCD, or the like, or combinations thereof. The display 31 may possess a square or a rectangular aspect ratio and may be viewed in either a landscape or a portrait mode. In various embodiments, the display 31 may also include a touch screen occupying the entire screen or a portion thereof so that the display functions as part of a user interface. The touch screen may allow the user to interact with the mobile electronic device 22 by physically touching, swiping, or gesturing on areas of the screen.

The application 24 may include instructions for gathering and organizing items, preferably comprising or including "to do" lists. An "item" should include at least one product and/or activity. For instance, an "item" might comprise a "to do" list of products to acquire, or may comprise a single product or activity. An item might, for example, comprise any of the following: "grocery list"; "jog/exercise"; "drop off donations"; "pick up nails"; "Smiley's Burgers"; and "go to drug store." From the illustrative list set forth immediately above, it may be seen that any grouping of words and/or characters representing one or more products and/or activities that may be matched against PIL profiles may constitute an "item" under embodiments of the present invention.

In an embodiment, the item-tracking application 24 may be configured to directly or indirectly (e.g., via the location determining element 32 and/or a digital mapping application running on the device 22) determine the geolocation of the device 22. Such location-tracking may be periodic and/or, preferably, substantially continuous. In an embodiment, geolocation(s) of the device 22 previously or currently and/or expected geolocation(s) in the future (e.g., where a digital mapping application provides intended travel route data) are determined by the device 22.

The mobile electronic device 22 may execute the item-tracking application 24 to manage and analyze PIL profiles, device 22 geolocation(s), and items for automated location interaction management. In an embodiment, PIL profiles are matched against items as part of determining that a location interaction trigger has occurred, as discussed in more detail in the following sections. The matching may be performed in a variety of ways. For instance, in a simple embodiment, PIL profiles may include data describing the offerings (i.e., goods, services and/or activities) offered at a PIL. The mobile electronic device 22 (and/or the coordination computer server 16) may compare the word(s) at least partly defining an item against the word(s) comprising the PIL offerings data in an attempt to find a match. Initial PIL offerings data may be supplemented by the remote coordination server 16 to include synonyms, and/or to cover all possible brand name and/or product naming conventions and variations. Moreover, various formatting and pre-processing operations may be performed on the items and/or PIL data to reduce false negatives, for example where a typo, unintended space, capitalization or other factors could otherwise introduce error into the matching process.

In an embodiment, the item(s) and/or PIL offerings data may also or alternatively be compared for matches through submission as part of a query to a semantic matching operator such as that offered under the service mark S-MATCH™ as of the filing date of this disclosure.

In another embodiment, the applications 24, 56 of the mobile electronic device 22 and the entity info server 18 (respectively) may be singly or collectively configured to perform automated location interaction management for items and PIL offerings data that match pre-defined entries within a more sophisticated ontological and/or taxonomic framework. In such an embodiment, the application 24 may be configured to store the framework as a tree structure, with, for example, all known categories of products/activities forming classes, specific products/activities falling within each category comprising sub-classes, and products/activities of particular providers (e.g., brands) and/or one or more selected product/activity attributes forming instances of each sub-class. In this example, a user may be permitted to define an item at the class, sub-class and/or instance level. It is foreseen that a wide variety of taxonomic frameworks may be implemented without departing from the spirit of the present invention.

The framework outlined above may be configured to address a wide range of products and activities, but could be burdensome for a user and/or profile owner to operate. For example, defining one or more items according to the tree-structure framework outlined above could involve scrolling or otherwise searching through many classes, sub-classes and/or attribute listings, requiring significant time of the user to enter even a single item. This may be true even in cases where word-search, auto-complete and/or similar shortcut functions are employed to simplify a user's experience at a user interface of the mobile electronic device.

In still another embodiment, placement of an item and/or PIL offering within categories of an ontological/taxonomic framework may be performed automatically. Also or alternatively, embodiments of the present invention may utilize pattern-based core word recognition to support ontological matching or similar functions, for instance to interpret multi-word descriptions of an item for matching against core concepts and/or words/phrases represented within the ontological/taxonomic framework.

An ontological/taxonomic framework preferably permits the application 24 to receive item definitions from a user in free-form, without the requirement for extensive efforts by the user to confirm or otherwise place the item within a pre-defined class or sub-class or otherwise define the item upon initial entry. Likewise, the framework preferably permits profile owners to manually and/or automatically populate PIL profiles without the requirement for extensive efforts to confirm or otherwise place the offerings within pre-defined class(es) or sub-classes or to otherwise define the offerings. In this manner, such a framework may function to map correspondences between items and PIL offerings data automatically and without the need for substantial user and/or profile owner involvement.

An exemplary ontological framework may include classes of location types (or "PIL types") at a highest level of a hierarchy, for example public spaces, grocery stores, drug stores, donation sites, commercial recreational activity sites, and so on and so forth. Classes may be determined according to commercial merchant codes or according to other methods of delineation without departing from the spirit of the present invention. Subclasses may also be defined beneath the classes, for example the "grocery stores" class may include subclasses for each known business entity operating a grocery store (e.g., "Farm Center Grocery" or the like). Further, second level subclasses may be defined beneath the subclasses, for example where sets of products and activities are defined (e.g., Farm Center Grocery may offer "Italian foods," "Medical clinic services," "meat counter" or the like). Still further, third level subclasses may be defined beneath the second level subclasses, for example where specific products and activities are delineated (e.g., "noodles," "flu shots," "sirloin," or the like). Yet still further, instances of the third level subclasses (or even lower level subclasses, where defined) may be defined according to attributes, aspects and/or features of the specific products and activities (e.g., "flour noodles," specific brand names, "prime grade sirloin," or the like). Properties of the classes, subclasses and instances may be defined to support more complex matching operations than the aforementioned simple taxonomic structure might permit, according to known conventions and as otherwise described herein.

One of ordinary skill will appreciate that the particular configuration of an ontological/taxonomic framework may be determined at least in part on the embodiment and matching schema employed, and that a wide variety of configurations and frameworks may be constructed within the scope of the present invention. For example, the ordering of concepts described in connection with the illustrative embodiment above may be changed (e.g., classes and subclasses may be reversed), the degree of granularity for definition of instances may be adjusted, and/or the properties describing relationships between the elements of the framework may be expanded and/or reduced, without departing from the spirit of the present invention.

Exemplary Computer-Implemented Method

Figure 6:
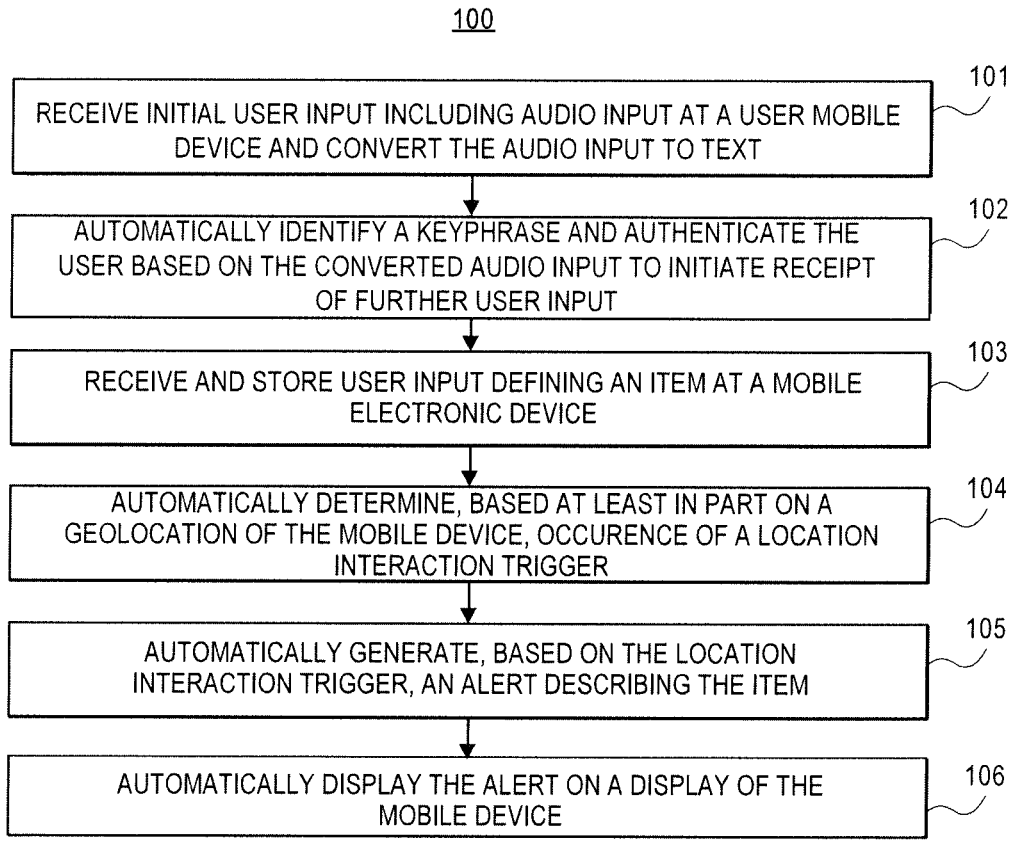
FIG. 6 illustrates at least a portion of the steps of an exemplary computer-implemented method for automated location interaction management.

FIG. 6 depicts a listing of steps of an exemplary computer-implemented method 100 for automated location interaction management. The steps may be performed in the order shown in FIG. 6, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIGS. 1-5. For example, the steps of the computer-implemented method 100 may be performed by the (user) mobile device 22, the mobile site device 20, the network 14, and one or both of the servers 16, 18 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. For example, the steps performed by the servers 16, 18 may be performed in whole or in part by one or both of (user) mobile electronic device(s) 22 and an on-site electronic device—e.g., according to the concepts introduced above in connection with beacon and/or RFID electronic devices—without departing from the spirit of the present invention. For another example, knowledge base(s) used for item definition and/or profile matching may be stored at and/or distributed across any number of device(s) within the scope of the present invention. For still another example, the steps performed by the mobile electronic (or user) device(s) 22 may be performed in part by one or both of the servers 16, 18 without departing from the spirit of the present invention.

One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, a user may provide initial user input including audio input at a user mobile device, and an item-tracking application of the user mobile device may automatically convert the audio input to text. The initial user input may comprise a word or action (e.g., pressing a button on the user mobile device) that activates a microphone of the user mobile device for receipt of the audio input. The audio input may include one or more spoken words which may be converted to digital data using speech recognition technology.

Referring to step 102, the item-tracking application may automatically identify a keyphrase within, and may authenticate the user based on, the audio input. For instance, the user mobile device may utilize speech recognition to automatically recognize one or more words from the audio input—such as "make new list"—and based thereon may make available one or more functions of the item-tracking application. Exemplary speech recognition techniques may include and/or utilize hidden Markov models, dynamic time warping, neural networking or the like, or combinations thereof.

The recognized keyphrase(s) may also specify one or more function(s) for execution in response thereto. For example, "make new list" may cause the user mobile device to automatically initiate data collection for storage of one or more new item(s) in a new list. For another example, "add to grocery list" may cause the user mobile device to automatically locate an existing "grocery list" and initiate data collection for editing of the existing grocery list. It is foreseen that the initial user input may automatically trigger the item-tracking application generally and/or may initiate one or more specific functions of the item-tracking application without departing from the spirit of the present invention.

The item-tracking application may also automatically authenticate the user based on the initial user input, for instance by generating a voice print of the audio input and comparing the voice print against a verified voice print of the user. More particularly, an output of the speech recognition analysis may be a stream of text words. The user mobile device may generate a spectrogram or utilize a short-time Fourier transform to create a voice print to compare against a verified voice print in order to identify the voice of the user. If the voice print matches the verified voice print, then the user may be authenticated.

One of ordinary skill will immediately recognize that other information (e.g., key codes, possession-based tokens, other biometric data, etc.) may be used alone or in combination to authenticate the user within the scope of the present invention. One of ordinary skill will also appreciate that no authentication may be required without departing from the spirit of the present invention. Moreover, it is foreseen that other user input—for instance selection of a corresponding application icon via a user interface of the user mobile device—may cause a call to and/or otherwise initiate operations of the item-tracking application for automated location interaction management without departing from the spirit of the present invention.

Referring to step 103, the item-tracking application may receive additional user input defining one or more item(s). In an embodiment, the additional user input may comprise additional audio input received via the microphone and converted to digital text data. For instance, the user may speak the words "go to the grocery store," "don't forget to jog," "pick up noodles," "steak," "remember briefcase for work," and so on and so forth. It will be appreciated by one having ordinary skill that other forms of additional user input such as swiping, typing and/or tapping at a user interface and/or display of the user mobile device may be received and used to define one or more items without departing from the spirit of the present invention. It will also be appreciated that each item may be stored as an entry in a relational database, with data fields defining interrelationships between entries (e.g., associations discussed below) and/or containing metadata or other associated data discussed herein. One of ordinary skill will also appreciate that items may be stored using different data storage structures within the scope of the present invention. It will also be appreciated that the item(s) may individually and/or collectively be presented at a user interface and/or display of the user mobile device in a variety of ways without departing from the scope of the present invention.

Each item may be defined entirely or partly by the additional user input. For instance, in a simple embodiment, the user mobile device may automatically create a record for the item and simply enter the converted text into a primary content data field of the record, without further analysis and/or attempts at categorization within a taxonomic/ontological or pre-determined framework other than, perhaps, to note a list the user indicates the item belongs to. In this manner, such input may simply be received and stored as "free form" text.

However, it is preferable to automatically perform preprocessing and/or taxonomic/ontological placement processes in connection with processing user input for storage as one or more item(s). In accordance with the various embodiments discussed elsewhere herein, the user mobile device may be configured to automatically pre-process user input to elucidate one or more core or common denominators or words that may be used for matching and/or categorization purposes. For instance, metadata may be added to other data fields of the item's entry to indicate likely core meaning of the free-form primary data field, to include synonyms, and/or to cover all possible brand name and/or product naming conventions and variations that may be useful in performing matching and/or reorganization processes discussed below. Moreover, various formatting and pre-processing operations may be performed on the free-form user input to reduce false negatives, for example where a typo, unintended space, capitalization or other factors could otherwise introduce error into the matching and/or organization process(es) discussed herein.

In an embodiment, the item-tracking application may automatically instruct display of one or more pre-defined options for selection by a user to define the item(s) in response to user input. The user mobile device may store and/or be configured to access a remote database storing a catalog of products and/or activities from which the user may select to further define the item. The catalog may be organized in a tree structure, permitting the user to navigate a series of menus presenting progressively narrow subject matter to arrive at one or more selection(s) that may define the item. Moreover, the user mobile device may be configured to automatically perform word searching of such catalog(s) and/or auto-complete operations on user input to make selection of pre-determined options more efficient.

In an exemplary embodiment utilizing a catalog to support definition of item(s), the user may provide user input embodying the word "noodle," and the user mobile device may be configured to consult the catalog to present the user with a plurality of pre-defined options including or otherwise associated with the word "noodle" (such as "noodle (food item)," "noodle (flotation device)," etc.). In another exemplary embodiment, the user may provide user input embodying the word "run," and the user mobile device may be configured to consult the catalog to present the user with a plurality of pre-defined options including or otherwise associated with the word "jog" (such as "go jogging," "jogging shoes (retail)" or the like).

One of ordinary skill will immediately appreciate that each item is preferably associated with at least some metadata for use in matching and/or automated association determination operations described elsewhere herein. The metadata may be automatically determined by the user mobile device based on analysis of historical user data and/or other data provided by a remote coordination server, may be entered manually by the user, and/or may be otherwise generated for storage in corresponding item entries. For instance, such metadata may: clarify boundaries of a satisfactory PIL for addressing an item (for example, the metadata may indicate that a restaurant should be at least moderately pricey to address a "make dinner reservations item"); clarify whether an item defined as a good is to be addressed by selling, buying and/or donating the good; specify that an item needs to be addressed at a particular PIL and/or one of many PILs having a particular type and/or brand-name designation, and so on and so forth.

The item-tracking application may be configured for practical application of such metadata in many ways. For example, where an item is defined as "take a bath," the item-tracking application of the user mobile device may be configured to add metadata to the item comprising a "sensitive user preference item" flag, effectively narrowing the PILs at which the item may be addressed to exclude public bath facilities (assuming, for instance, that the item is known by the item-tracking application to be addressable at a place of habitation). For another example, purchasing history of the user may be automatically analyzed to determine frequent departures from efficient behavior, which may help the user mobile device to automatically determine user preferences. In an embodiment, if a user always buys ice cream from a specific PIL despite the PIL being several miles further away than another PIL selling ice cream, the user mobile device may be configured to automatically recognize same and to enter the distant PIL into a metadata data field of a "pick up ice cream" or similar item data entry. It is foreseen that many such automated categorization and metadata-generation and/or utilization processes may be employed within the scope of the present invention. One of ordinary skill will also appreciate that automated metadata generation may be overseen via manual user approval processes within the scope of the present invention.

An item may stand alone (with or without associated metadata and/or other data fields of the entry). The item may also be associated with other item(s), for example through association with the same list. Association(s) between item(s) (or the lack thereof) may be driven by user input and/or automated analysis. For example, the initial and/or additional user input may specify such an association, such as where the user speaks "add to grocery list noodles" or selects a "grocery list" via the display of the user mobile device prior to specifying "noodles." Such associations may inform the format for presenting item(s) to the user at the user display of the user mobile device, for example by providing titled lists the user can more easily navigate and conceptualize as opposed to a simple string of all stored items.

The item-tracking application may also or alternatively receive user input at least partly defining an item and may automatically analyze same for an association with existing items, such as where the additional user input comprises "noodles" and the user mobile device automatically compares the term "noodles" against existing items and/or item template(s) to generate and/or recommend an association therebetween. For instance, based on the partial definition of the new item received via user input (e.g., "noodle"), the user mobile device may automatically identify an existing item (such as a "grocery list" or "beef") for potential association. The user mobile device may base such a determination on a likelihood that the new and the existing items may be addressed at a single PIL type (and/or at a specific PIL or group of proximate PILs likely to be visited).

In an embodiment, a catalog (see discussion above) that categorizes products and activities beneath PIL types or categories may be consulted by the user mobile device. The item-tracking application may use such data to automatically identify association(s) or potential association(s) between a new item and one or more existing item(s). For example, a catalog may group goods commonly sold at grocery stores together. The user mobile device may automatically access the catalog to determine a potential association between a new item "noodles" and an existing item "grocery list" or "beef," based on such a grouping. In another example, semantic matching tools and/or taxonomic/ontological frameworks may be employed to assist with automated generation of association(s) between items.

In another embodiment, the item-tracking application may also or alternatively be configured to identify one or more specific PIL(s)—e.g., a specific grocery store—likely to be visited by the user. The catalog and/or a PIL profile(s) for the identified PIL(s) may be automatically consulted by the user mobile device to determine potential association(s) between items based on inventory-specific offerings data. The term "inventory-specific" as used herein refers to approaches utilizing data regarding known inventory at particular PILs. The term "inventory-agnostic" refers to approaches utilizing more general data about what types of products and/or activities are typically offered at PIL-types and/or at locations of a particular brand name or the like (without confirmation that a particular PIL near the user actually has such offerings).

In the example followed immediately above, the user may frequent a particular store carrying both "noodles" and "beef"—which may be determined by consulting inventory-specific data in the catalog and/or a PIL profile—and the item-tracking application may automatically determine an association between the two items based thereon. Such automated analysis may be improved where prior purchase data for the item is available. For example, a mobile shopping cart function may be incorporated into and/or synced with the item-tracking application, as discussed in more detail below, and/or the item-tracking application may be configured to track previously-addressed items in connection with PILs at which they were addressed. Prior purchase data relating to noodle purchases may be used alone or in combination with historical PIL visitation data to identify other items frequently purchased with noodles at one or more PILs and/or other items available at those PILs, and one or more association(s) may be generated between items based on such automated analyses.

Where the item-tracking application automatically determines an association between items, the item-tracking application may automatically request confirmation or approval of the recommended association before applying same to the item. The user may also choose to edit an existing item, for example by adding metadata to the item, changing existing data associated with the entry corresponding to the item, changing one or more association(s) between items, deleting an item, and so on and so forth.

The item-tracking application of the user mobile device may be configured to dynamically adjust associations between items upon and/or following initial entry of each item, e.g., to maximize efficiency in addressing the stored items. For example, the item-tracking application is preferably configured to store associations between items to increase a likelihood of achievement at a single PIL and/or at several PILs proximate both to the user (and/or an estimated future location of the user) and to one another. One embodiment of such associations may be a "list" of related items grouped so as to be addressed around the same time and/or in about the same location.

The user mobile device may keep a running tally of an estimated total time (or distance traveled) required to address all (or a subset) of the outstanding items stored on the user mobile device. Subsets of items may optionally be organized into "trips" or the like, with an optimization operation described herein being focused on an individual trip in relative isolation and without considering items that are likely not to be addressed on the trip. Whether all items are considered together or in subsets, the user mobile device may be configured to adjust associations between considered items to automatically minimize the corresponding tally for efficiency.

In an example, the following items may be stored in three lists slated to be addressed in a single trip, with each list of three items being initially grouped and organized according to user input/direction: (List A) beef, noodles, broccoli; (List B) get tires, drop by Flying Palace, go jogging; (List C) pick up roses, get earrings, make dinner reservations. It will be appreciated by one having ordinary skill that Lists A, B and C may initially be organized by the user according to topic or some other organizational tool, and not necessarily for maximal efficiency.

The item-tracking application of the user mobile device may be configured to automatically adjust the associations between the items of Lists A, B and C—for example by reorganizing them into new lists—to minimize the tally of total time (and/or distance traveled) required to address all items set forth therein. This may help the user to plan trips to address the items.

In a simple embodiment, the user mobile device may determine a real or estimated geographic location of a user via a location determining element and/or based on historical data relating to the user (e.g., place of residence, historical purchase data including PIL data, etc.). Based on the determined or estimated geolocation of the user, the user mobile device may automatically consult PIL profiles and/or available catalog database(s) to calculate the lowest possible tally for addressing the items on the Lists A, B, C based on proximate PILs with available inventory data. The item-tracking application may also or alternatively be configured to obtain and/or otherwise determine future location(s) of the user (e.g., by consulting a route stored by a mapping application of the user device) for use in identifying specific PILs. The item-tracking application may also or alternatively automatically determine preferred PILs relating to the items—for instance based on historical transaction data linked to PILs—and may prioritize PIL-selection accordingly.

In an embodiment, based on the user location data outlined above, the item-tracking application of the user mobile device may be configured to automatically identify all PILs within a travel radius around the user location (and/or a plurality of travel radii determined from a future route and/or multiple future locations). The extent and/or contours of each travel radius may be pre-determined based on user travel patterns and/or expectations. For example, the user's movement may be analyzed over the course of several months to determine average boundaries and/or preferred extent of travel. In an embodiment, if more than half of a user's trips (e.g., movements occurring between returning to a place of residence) are confined within a fifteen-mile radius, the item-tracking application may be configured to use a fifteen-mile travel radius. For another example, a travel radius may also or alternatively be determined at least in part based on travel expectations, such as where a calendar or alarm entry accessible via the user mobile device notes a trip to another city, and/or a mapping application of the user mobile device contains saved route data for an upcoming trip. In an example, a travel radius may be smaller during an extended road trip (e.g., a trip greater than forty miles, potentially without a return leg) than during a typical local trip because the user is less likely to venture far from a planned route during an extended road trip as compared with a typical local trip to run errands. Similarly, a travel radius may be extended more forward (in a direction of travel) than backward because the user is less likely to accept any backtracking on an extended road trip.

Further, a travel radius may also or alternatively be determined according to device and/or application settings, for example where the user defines a travel radius during a setup process. In another example, a travel radius may be determined at least in part by a manufacturer and/or a remote coordination computer server, for instance based on average consumer travel radius within a relevant geographic region. In still another example, item availability density may be considered when automatically determining a travel radius, such as where a rare product is sold in only a few locations in a state, thereby causing an expansion in a travel radius for a trip in which the rare product is to be addressed.

It is foreseen that other methods of determining a travel radius may be used without departing from the spirit of the present invention. It is also foreseen that no travel radius may be automatically defined by the item-tracking application in embodiments of the present invention, it being understood that a user mobile device may simply identify all PILs within a set geographic boundary and/or access all data regarding PILs within a particular database in order to automatically determine new associations between items without departing from the spirit of the present invention.

Where available, the user mobile device and/or a remote coordination computer server may access inventory-specific offerings data regarding the available PILs—e.g., those that have been identified within a travel radius—to automatically determine new associations between the items of Lists A, B and C and generate an optimized travel tally.

In an embodiment where specific inventory information regarding PILs is not available to the user mobile device, the item-tracking application may adopt an inventory-agnostic optimization approach. For instance, the item-tracking application may be configured to access a catalog generally grouping items according to types of locations likely to offer same, without reference to inventory data specific to the PILs proximate the user. In such an embodiment, the item-tracking application may automatically reorganize items into the fewest number of lists possible based on the catalog grouping(s), for instance where each reorganized list includes items generally addressable at a single PIL type.

It is foreseen that the item-tracking application may be configured to consider PIL type-availability density (discussed below)—for example by excluding PIL types having low availability density—without departing from the spirit of the present invention. In an embodiment where the user mobile device does not have inventory-specific data, and PILs near the user are not specified, the item-tracking application of the user mobile device may be configured to exclude rarely-occurring PILs from automated optimization and reorganization efforts. More particularly, the general catalog groupings may note the existence of a few super department stores that offer massages, but, because of the scarcity of such stores, may assume none are reasonably proximate to the user and instead opt to only consider the average super department stores having typical offerings in automated reorganization.

Turning again to the example set forth above, automated, inventory-agnostic reorganization of Lists A, B and C by the item-tracking application of the user mobile device may seek to minimize the number of PILs required to address all the items. For instance, a catalog storing a general taxonomy of product and/or activity offerings (see discussion above) may be consulted to produce the following reorganized lists: (List A') beef, noodles, broccoli, get tires, pick up roses, get earrings; (List B') drop by Flying Palace, make dinner reservations; (List C') go jogging.

The item-tracking application may be configured to denote the PIL-types used to reorganize Lists A', B' and C' for display to the user. In the example, List A' may comprise items expected to be addressable at the average (relatively plentiful) super department store, which includes auto service and grocery sections, and an annotation reading "super department store" may be added to List A' in a manner viewable to the user. List B' may comprise offerings of a majority of "Flying Palace"-branded child recreational centers (which also offer food around dinner time), and a corresponding annotation may read "Flying Palace." Further, List C' may comprise an activity offering not available at the PIL-types of Lists A' or B', and is therefore reorganized as a standalone item. The user mobile device may optionally annotate a suggested PIL-type for addressing the item on List C', such as "park."

It should be noted that brand name references such as "Flying Palace" may, in some embodiments, override PIL type-availability density rules (see discussion above), for example because the rules and logic comprising the item-tracking application may be configured based on the assumption that the user would not define a specific brandname for a PIL if it were not proximate the current or future location of the user.

The item-tracking application may also be configured to permit the user to select from a plurality of alternative PIL-types. For instance, where a list is automatically denoted with a super department store, but the user knows only a grocery store is available in the intended locale, user input may change the designation to a grocery store and the item-tracking application may automatically reorganize the lists based on the user selection.

Preferably, the user input is stored as historical data for use in future automated analyses. For example, in the example above, the item-tracking application may be configured to assume a super department store is not available to the user (at least in an area proximate the user when the de-selection was made) if the user manually de-selects the super department store one or more times (depending on the logic of the rules employed). In addition, the user may be permitted to manually edit the lists and select corresponding PIL-types. Optionally, where only some of the items are manually edited by the user, the item-tracking application may be configured to automatically reorganize the remaining items while holding the user selections constant.

In inventory-agnostic optimization processes, metadata stored in connection with one or more items may also inform automated association determinations by the item-tracking application. For example, where the item "make dinner reservations" is known—based on metadata of or references to the corresponding entry—to be addressable by a telephone call, the item may be removed from List B' and placed on a standalone list D'. Further, where "go jogging" is known—based on metadata of or references to the corresponding entry—to be addressable at the user's place of residence, the item may be combined with the "make dinner reservations" item into a List C". It is foreseen that metadata of many varieties may be incorporated into the rules of the item-tracking application of the user mobile device without departing from the spirit of the present invention.

It should be noted that, under the inventory-agnostic approach outlined above, the number of PILs expected to be visited (corresponding to the number of reorganized lists A', B' and C') matches the number of original Lists A, B and C. It will be apparent to one of ordinary skill that such reorganized lists may be equally as numerous as, or even more numerous than, user-organized lists, at least because the user may not employ efficiency or accomplishment-based logic when creating the original lists.

Turning to an embodiment of the example in which inventory-specific data is available regarding one or more identified PILs, seven exemplary PILs may be identified. Data regarding the offerings and locations of each of the identified PILs may comprise the following: park (5 miles NW)—"jogging"; grocery store (4 miles NW)—"beef," "noodles," "broccoli," "roses"; jewelry store (2 miles E)—"earrings"; super department store (2 miles SE)—"beef," "noodles," "broccoli," "tires," "tire installation services"; Flying Palace recreational center (5 miles N)—"food served from 10 a.m. to 6 p.m."; auto parts store (2 miles NW)—"tires"; and a restaurant (5 miles S)—"dinner menu" and "walk-in or reservations welcome."

Using the inventory-specific data set forth above, the item-tracking application of the user mobile device may be configured to automatically generate new associations between the items on Lists A, B and C to optimize the travel distance (and/or time) required on a trip to address the items. The item-tracking application may be configured to perform the optimization calculations based only on geolocation data or, more preferably, is configured to make data queries to the remote coordination computer server—for example via an application programming interface (API)—to compare actual route length and duration using (street) mapping software or the like. The user mobile device may thereby produce the following reorganized lists: (List A'"—auto parts store) get tires; (List B'"—grocery store) beef, noodles, broccoli, pick up roses; (List C'"—park) go jogging; (List D'"—Flying Palace) drop by Flying Palace, make dinner reservations; (List E'"—jewelry store) get earrings.

In inventory-specific optimization processes, metadata stored in connection with one or more items may also inform automated association determinations by the item-tracking application. For example, where metadata regarding the "get tires" item indicates that installation services are likely also necessary, List A'" may be replaced by List A"", comprising "get tires" at the super department store, where installation services are also offered.

For another example, metadata regarding the "make dinner reservations" may indicate a connection to a celebratory anniversary event (e.g., via consultation of a digital calendar accessible via the user mobile device). The item-tracking application may be configured to seek restaurants of a certain minimum quality—for example, based on the event and/or historical data regarding the user's preferences for celebrating anniversaries—to address the "make dinner reservations" item. The item-tracking application may therefore be configured to automatically place the "make dinner reservations" item in a List F"" which may be addressed at the identified restaurant PIL. For still another example, the metadata saved with the "make dinner reservations" entry may indicate a preference for phoned-in reservations, removing the need to associate a PIL with the "make dinner reservations" item.

The item-tracking application may be configured to automatically transition between inventory-specific and inventory-agnostic optimization processes and/or to utilize a blend of both approaches. For instance, in an embodiment, the user mobile device may continuously or periodically attempt to access PIL inventory data for addressing a plurality of outstanding items within a trip based on a user's current and/or projected future location. Where such data is available, the item-tracking application may be configured to utilize same to automatically generate new associations (i.e., reorganize) items found to be offered by the PILs for which inventory data is available. Remaining outstanding items of the trip may be organized according to inventory-agnostic optimization processes.

It will be appreciated that automated association determinations and/or reorganization of items according to the concepts outlined above may aid a user in planning future activities. In an embodiment, the item-tracking application may be configured to use automatically reorganized "to do" lists to map one or more routes (e.g., with the aid of a mapping software application) for a trip on a display of the user mobile device. Preferably, the routes may be made available for access by a mapping software application to enable automated satellite navigation or the like to aid the user in traversing the route. It should be noted that the mapping feature may not be available where information regarding PILs proximate the user is also not available.

The user may also be offered an option for selecting and/or de-selecting PILs represented on such an automatically-generated route planner interface. PILs represented at the user interface preferably include PILs to be visited on the proposed route as well as all other PILs in the area that are known to the user mobile device. This may permit the user to perform manual trip editing by selecting PILs that the item-tracking application did not select according to automated optimization processes.

The item-tracking application may be configured to automatically determine new associations between and/or to reorganize the items (e.g., by generating a new set of "to do" lists) based at least in part on the user input at the user interface of the user mobile device. For instance, the user may change an automatically-selected grocery store to another grocery store represented at the user interface (based on, for example, user preference for the meat counter at the newly-selected store). The user mobile device may be configured to automatically determine a new set of associations assuming travel to the user-selected store, and to display a new route for the trip based thereon.

It is also foreseen that a user may manually select a PIL for addressing a single item from a list of items—leaving the item-tracking application to automatically determine the best PILs for addressing the other items on that list—without departing from the spirit of the present invention. The item-tracking application may also automatically update the item associations and/or the contents of lists based, for instance, on changes to the items and/or changes to the user's actual or projected future location(s).

More broadly, the user mobile device may reorganize items using the approaches outlined above according to the following hierarchy, in order of precedence: user-defined associations first, inventory-specific associations second, and inventory-agnostic associations for any remaining items. The user mobile device may also be configured to alert the user if new inventory and/or PIL information becomes available after a trip plan has been generated and viewed by the user, and/or if user movement causes automated reorganization of a trip plan (e.g., where a PIL is added or removed from the trip plan based on user movement). The alert may notify the user of a new trip plan and allow an opportunity for manual editing of same.

Referring to step 104, the item-tracking application may automatically determine, based at least in part on a geolocation of the user mobile device, occurrence of a location interaction trigger. The location interaction trigger may be an output from one or more trigger rules or algorithms. The one or more trigger algorithms may periodically or continuously produce outputs indicating whether a location interaction trigger has occurred.

In an embodiment, a trigger algorithm may determine occurrence of an interaction trigger based at least in part on (1) actual or expected proximity to a PIL, and (2) matching of an item to the actual or estimated offerings of the PIL. In a simple embodiment, the user mobile device may be configured to transmit location data to the remote coordination server, along with all or a subset of outstanding items to be addressed (including any metadata that may be useful for matching purposes). The remote coordination server may be configured to match the items against inventory records to determine one or more matches between an item and PIL inventory records. Where inventory records are not available (e.g., in inventory-agnostic situations discussed above), the remote coordination server may be configured to categorize PILs that are or will be near the user into location types and to access a general catalog containing possible products and/or activities typically offered at those location types (see description of the general catalog above in connection with determining automated associations between items). All or some of the inventory/catalog data may be obtained from an entity info computer server storing PIL profiles, for instance via a call to an API maintained by the entity info computer server for providing such data.

The remote coordination server may match the item data against the inventory/catalog data using a semantic matching operator, a more sophisticated ontological and/or taxonomic framework, and/or other technology suitable for determining matches with an acceptable degree of accuracy, again according to the description above. Matching one or more items against the real or estimated offerings of a PIL may be performed intermittently or on a rolling basis.

A simple trigger algorithm may determine a trigger has occurred each time the user mobile device comes within a set distance of a PIL that has an offering that matches an outstanding item being managed by the item-tracking application of the user mobile device. For instance, the user mobile device and/or coordination computer server may calculate a single geofence around each PIL. The radius of the geofence may be determined according to a pre-configured setting. In an embodiment, each PIL geofence may comprise a circle with a radius one mile larger than that of an imaginary circular property border of the PIL. The imaginary property border may be determined according to a number of methods, but in a simple embodiment may consist of the smallest circle that encompasses the entirety of a PIL's property boundaries. The PIL's property boundaries may be determined according to two-dimensional data from a satellite imaging system, for example. The PIL's property boundaries may correspond to the extent of real property associated with the PIL and/or with the extent of one or more buildings associated with the offerings considered by the item-tracking application without departing from the spirit of the present invention.

In this manner, each time the user mobile device passes within one mile of the property boundaries of a PIL at which an item match can or is expected to be found, the trigger algorithm may determine that a location interaction trigger has occurred. It should be understood that most property boundaries are not circular, and therefore the simple trigger algorithm described above may, for some PILs, generate trigger outputs at distances of more than one mile from the nearest portion of a boundary. In another embodiment, the trigger algorithm may automatically generate geofences of complementary shape to property boundaries of PILs, for example to maintain a consistent degree of separation between the geofence and the boundary.

The trigger algorithm may also be configured to calculate a degree of separation of a PIL's geofence from its property boundary based on the anticipated interaction. The trigger algorithm may be configured to expand or contract the geofence based on at least: (1) the number of outstanding items matched by the PIL (whether based on actual or estimated PIL offerings data); and/or (2) the availability density of the item(s) matched by the PIL. For example, where a PIL offers or is expected to offer three-quarters of a user's outstanding items, the trigger algorithm may be configured to expand the geofence for the PIL. Where the item(s) matched against the PIL are expected to be offered by a high number of other PILs within the travel radius (i.e., a high availability density), however, the trigger algorithm may be configured to contract the geofence for the PIL. On the other hand, where a product is rare and is not expected to be offered at any other nearby PIL, the trigger algorithm may be configured to greatly expand the geofence for the PIL (e.g., to the boundary of a travel radius). The relative weighting of the proportion of items addressable (1) and availability density (2) factors within the trigger algorithm may be variable and/or adjustable without departing from the spirit of the present invention.

In still another embodiment, the items may be pre-organized into lists or the like (see discussion above) expressly or implicitly pre-approved by the user. Where the user mobile device utilizes automated and/or manual grouping of items to maximize trip efficiency, the item-tracking application may be configured to automatically delineate trigger outputs into classes. For example, a trigger algorithm may determine occurrence of a location interaction trigger based on at least factors (1) and (2) described immediately above and matching of item(s) on a first list against actual or estimated inventory offerings of a first PIL. However, the first PIL may not be of the PIL-type and/or may not be the specific PIL identified in the list for addressing the matching item(s) according to earlier optimization processes and/or trip planning. The resulting output of the trigger algorithm may comprise a second-class output. On the other hand, passing within the geofence of a specific PIL and/or of a location having the PIL-type identified according to optimization processes may cause the trigger algorithm to issue a first-class output. It should be noted that matches based on PIL-type—such as where a list is to be addressed at a "super department store" rather than at some specifically-identified location—may involve smaller geofences, it being less certain that the PIL the user comes near will meet the user's needs.

It is foreseen that other ways of ranking and/or recognizing matches between items and lists may be employed without departing from the spirit of the present invention. In an embodiment, trigger algorithm class outputs may be used to differentiate the presentation and/or types of alerts presented to the user, as described in more detail below.

Figure 7:
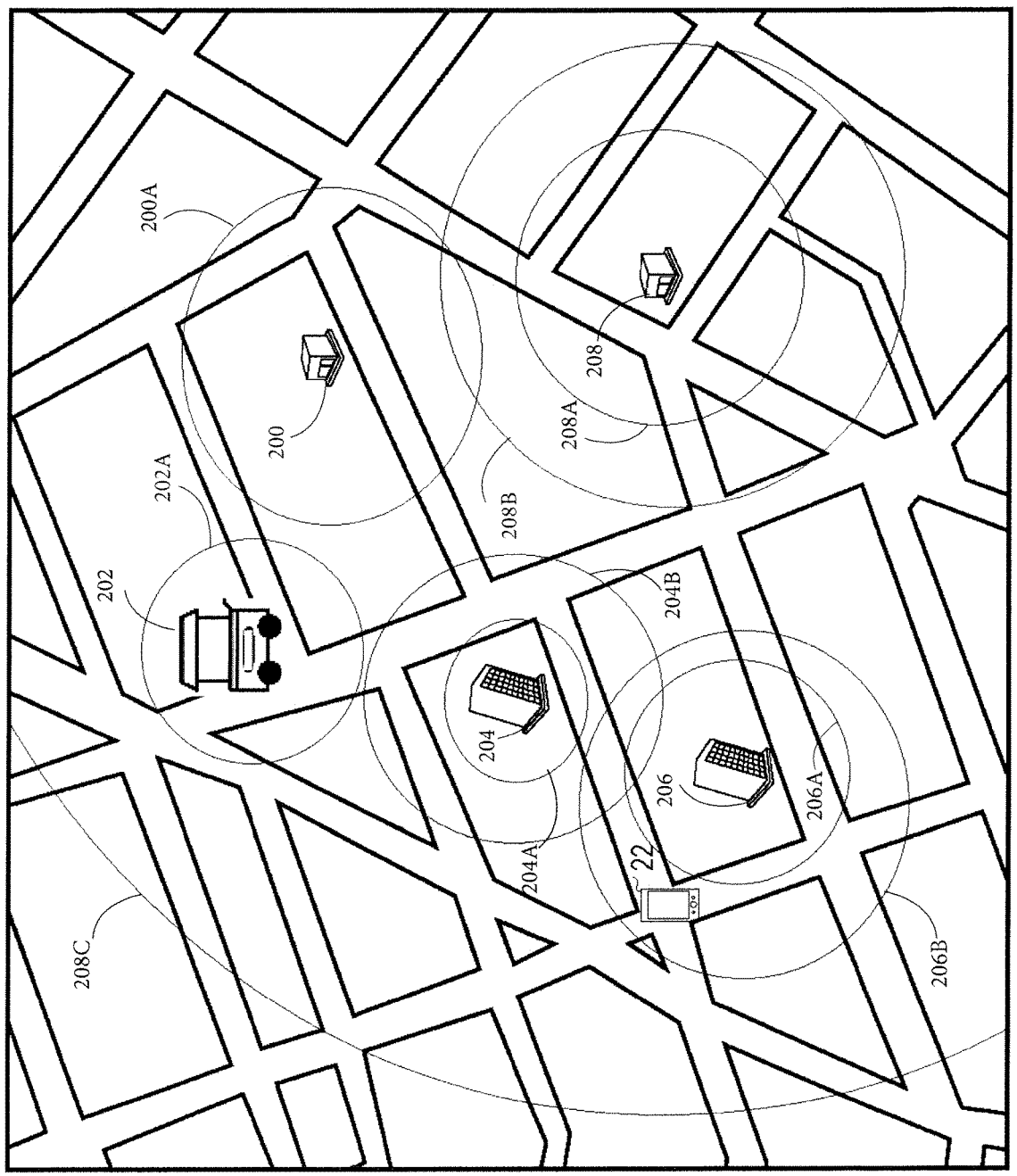
FIG. 7 illustrates an exemplary user interface presented by a mapping application in connection with embodiments of a system for automated location interaction management.

FIG. 7 illustrates an exemplary geofence map representing data that may be utilized and/or generated by a trigger algorithm to determine the occurrence of location triggers. PILs 200, 202, 204, 206 and 208 may be within a travel radius of the device 22. MPIL 202 may be operated by an employee carrying a registered mobile site device 20 for updating the location of the MPIL 202 to the entity info computer server 18, the coordination computer server 16 and/or the device 22. The device 20 may also upload inventory data to a profile registered in association with the MPIL 202.

Each PIL 200, 202, 204, 206, 208 is illustrated inside a plurality of potentially-applicable geofences. Each geofence surrounding one of the PILs is denoted A, B or C, respectively indicating a progressively larger perimeter around the PIL. The device 22 is illustrated within two distinct geofences—206B and 208C. According to the example discussed above, this may be because the trigger algorithm has determined that each PIL 206, 208 has a sufficient proportion of matches for the user's items and/or that the matched item(s) are of sufficiently low availability density to warrant determination of two corresponding location triggers. The trigger algorithm may also or alternatively have determined that one or both of PILs 206, 208 matches a specific PIL and/or a location having a PIL-type identified for addressing one or more item(s).

In an example, the relatively large size of the geofence 208C results from an item availability density calculation suggesting that the item offered or likely offered at PIL 208 is relatively rare and unlikely to be available at other area PILs. In another example, the size of geofence 208C results from the fact that PIL 208 is specifically identified in connection with addressing one or more item(s) managed by the item-tracking application of the user mobile device 22. In still another example, the size of geofence 208C results from estimated offerings matching nearly ninety percent of the items managed by the item-tracking application of the user mobile device 22.

The trigger algorithm may alternatively employ geofence 208B if, for example: the user provides user input to the user mobile device 22 indicating that the rare item is not to be addressed on this trip; the specifically-identified PIL 208 (e.g., "6/45 Gasoline") has numerous nearby locations also matching the specification; and/or a local beacon transmitting information about the inventory of the PIL 208 to nearby mobile devices provides data to the user mobile device 22 indicating that several of the items previously matched according to estimated offerings are, in fact, not currently available at the PIL 208.

In a similar vein, the relatively small geofence 206B may be a result of fewer item(s) matched, more widely available items matched, widely available PIL-type and/or specified location, etc.

One of ordinary skill will appreciate that a wide variety of trigger algorithms and/or geofence(s) may be used within the scope of the present invention. For instance, a simple geofence of set size may be applied to each PIL—which may correspond to a PIL-type where type availability density is generally available—without departing from the scope of the present invention.

The trigger algorithm may also be configured to generate on-site trigger outputs based at least in part on a location of the user on the premises of a PIL. For example, the user mobile device may be configured to automatically detect a user's interaction with a PIL. The item-tracking application may use a location determining element of the user mobile device to determine the occurrence of the interaction. Similarly, the user mobile device may also or alternatively determine the occurrence of the interaction based on proximity to a local PIL beacon for a pre-determined period of time and/or at a relatively constant signal intensity. Also or alternatively, the interaction may be evidenced by the user "checking in" at the PIL with a social media app in communication with the item-tracking application. As another alternative, if the user begins editing an item of a list of items organized (manually or automatically) by PIL, the user mobile device may be configured to assume that the user is at the PIL (preferably, where the list is synced with a mobile shopping cart function or the like). One of ordinary skill will appreciate that a plurality of tools and sensing and/or information input mechanisms may be utilized to determine a user's interaction with a PIL without departing from the spirit of the present invention.

On-site trigger outputs (i.e., those triggered by a user's movements at or near a PIL as compared with offsite outputs based on movements between PILs) may take a variety of forms. For example, where inventory data for the PIL is available along with layout data specifying the on-site location(s) where the matched items may be found, the trigger algorithm may be configured to issue trigger outputs identifying items that are relatively nearby the user at any given time. In a preferred embodiment, the item-tracking application may be configured to render an image of the store layout (including pathways and/or aisles where appropriate) at the user display of the user mobile device. The items and the current user location may be indicated on the layout to assist the user in locating the items. The user mobile device may include a magnetometer, gyroscope and/or other sensor, and the item-tracking application is preferably configured to access the sensor(s) and generate an indication of the direction the user is currently facing within the layout, again to aid the user in locating the items.

For another example, the item-tracking application may execute a completion failure rule to determine a pattern of movement indicating the user is beginning to disengage from interaction with a PIL (or a portion thereof) in which an outstanding item to be addressed is located. For instance, the user mobile device may detect or the item-tracking application may otherwise determine the user is moving steadily and without stopping toward an outside edge (or, if a layout is available, a known "exit") of the PIL and/or a geofence of the PIL. For another example, where a PIL layout is available, the user may be moving steadily and without stopping away from an area where an item is located that has not been indicated as "addressed" (or the like) by the user and/or through automated functions (e.g., via a mobile shopping cart). Where a layout is available, but the user location is not tracked, the item-tracking application may also be configured to automatically recognize transitions between areas of a PIL—for example by tracking item deletion(s) from a list—and thereby determine whether the user has departed a section at which an item should have been addressed. For still another example, the item-tracking application may determine that a check-out process has begun without addressing one or more item(s). In each case, the completion failure rule may cause a trigger output to be generated describing the item(s) remaining unaddressed and the reason(s) for the trigger output (e.g., "leaving the refrigerated section without the 'cheddar cheese'" or "leaving the store without the 'roses' on your list" or the like).

One of ordinary skill will also appreciate that a user may visit a PIL containing a matching item without a corresponding offsite alert and/or without a location-type and/or location label match. For instance, the item-tracking application may maintain two lists—one of items to be addressed at a super department store and another of items to be addressed at a botanical nursery—and the user may stop at a gas station. The trigger algorithm is preferably configured to recognize onsite interaction at the unplanned gas station PIL and to automatically match all items against known or likely inventory data. The trigger algorithm may automatically generate trigger output(s) for matching items while the user is onsite at the unplanned stop, providing the user the option of addressing same before departing the location. The user may also be provided with typical opportunities of providing user input in response thereto, for example by selecting "skip," "ignore," "delete" or other such options with respect to one or more of the items of the alert. The item-tracking application may be configured to automatically update the associations between and/or lists of items to take into account any items addressed and user input received at the unplanned stop.

Referring to step 105, the item-tracking application may automatically generate, based on the location interaction trigger(s) and trigger output(s), an alert describing the item(s). For instance, the item-tracking application may be configured to generate an alert for display to the user at the interface of the user mobile device. An offsite alert may include the following: the item(s) to be addressed; a location label (e.g., brand name and/or PIL-type); the location address and/or relative location (e.g., street address and/or "Five Miles NW" or the like); etc. An on-site alert may include the following: the item(s) to be addressed; the location title (e.g., brand name and PIL-type); the reason for the trigger output (such as "did you forget the 'milk' on your list" or the like). It is foreseen that alerts may take a variety of useful forms and/or may incorporate details or information outlined elsewhere herein without departing from the spirit of the present invention.

Referring to step 106, the user mobile device may be configured to automatically display the alert at the user interface. Where the item-tracking application is configured to sync with or otherwise provide instructions for display(s) by a mapping software application, the alert may be incorporated into the user interface managed by the mapping application. For instance, one or more PILs referenced by the alert may be highlighted or otherwise emphasized concurrently with display of a text box or the like describing the information of the alert. In an embodiment, the alert may alternatively be displayed without the assistance of a mapping application, for example where the alert display comprises a simple dialog box including the data of the alert.

In an embodiment utilizing trigger output classes, alerts may be displayed variously according to class membership. For instance, second-class outputs may correspond to alerts having less prominent lettering, with a soft accompanying audible notification, and/or under an assumption that the user will not choose to visit the specified PILs in the absence of some further input from the user to the contrary. In contrast, first-class outputs may correspond to alerts having more prominent lettering, repeated and/or loud accompanying audible notifications, and/or persistent display under an assumption that the user intends to visit the PIL (e.g., instructing a mapping application to re-route if a turn toward the PIL is missed). It is foreseen that alerts may be managed variously according to class membership in other ways without departing from the spirit of the present invention.

In an embodiment, the user may be offered the option of providing user input in response to an alert. For example, the user may be offered an option of selecting "Ignore" to dismiss an alert, thereby causing the trigger output underlying the alert to be ignored and the displayed alert dismissed. It should also be noted that the item-tracking application may be configured to automatically block future alerts partly or fully identical to an ignored alert (or otherwise relating to the specified PIL or PIL-type) for a pre-determined timeframe and/or throughout the remainder of a trip in which the original alert was ignored.

The user may also be permitted to indicate a desire to be alerted again the next time the PIL specified in an original ignored alert again becomes the subject of a trigger output (for example, once the user leaves and then returns to a position within the PIL's geofence). In an embodiment, the user may instruct the user mobile device to effectively skip to the next alert for the specified PIL if the user wishes to visit the PIL on a return leg of a trip. If a user simply chooses to "Ignore" rather than "Skip" an alert with respect to a particular PIL, the user mobile device may be configured to automatically reorganize the items by assuming the PIL will not be visited. The user may also choose to "ignore" or "skip" individual items or groups of items, and the item-tracking application may automatically reorganize remaining items in response thereto.

The user may also be permitted to indicate an intent to visit the PIL in response to an alert.

On-site alerts—such as those notifying the user of a potentially forgotten item and/or persistent alerts comprising a layout of the PIL overlaid with items inventoried at the PIL—may also present opportunities for user input. For example, the item-tracking application may be configured to accept the following exemplary user inputs responsive to an alert regarding an item at a PIL: an indication that an item should be "skipped" on the current trip; an indication that an item should be "deleted;" an indication that the alert should be delayed a certain period of time and/or until triggered again by user movement(s), and so on and so forth. Moreover, the user may be presented with an option to select and/or de-select one or more item(s) and/or groups/lists of items to indicate which are to be addressed at the PIL during the current trip.

One of ordinary skill will appreciate that a variety of user inputs may be employed in response to alerts within the scope of the present invention. The user mobile device may be configured to automatically reorganize and/or determine new associations between items in response to and/or following such user input(s). User input received in response to alert(s), such as that outlined above, may cause the user mobile device to automatically treat the resultant association as a "user-defined association" according to the hierarchical order of precedence that may govern automated reorganization and/or association processes described elsewhere herein.

In an embodiment, the item-tracking application may be configured to exchange information and/or instructions with a mobile shopping cart application. Exemplary mobile shopping cart applications may include the SCAN & GO® app offered by Wal-Mart Stores, Inc., the TARGET® mobile app offered by Target Brands, Inc. (in each case in the form offered at the time of initial filing of the present disclosure), or other software that may offer such functionality. The mobile shopping cart application may be configured to provide layout data useful in the automated processes of the item-tracking application outlined elsewhere herein.

The mobile shopping cart application may also provide shopping cart contents and/or purchase notification data to the item-tracking application of the user mobile device. The item-tracking application of the user mobile device may utilize the data provided by the mobile shopping cart application to automatically edit the referenced item(s), for example to indicate an item has been addressed and/or physically obtained in response to a message indicating that the item has been scanned into the mobile shopping cart via the mobile electronic device. The item-tracking application may also provide data regarding the item(s) to the mobile shopping cart application for use in populating layout and/or shopping guidance functions of the mobile shopping cart application without departing from the spirit of the present invention. Preferably, the mobile shopping cart application is configured to provide purchase data to the item-tracking application, and such purchase data may be relied upon as historical purchase data for purposes of conducting automated processes outlined herein.

It should be noted that computer learning may be utilized to improve item association(s), item data entries and/or metadata, matching to PIL offerings, ontological frameworks, and the like, according to the approaches outlined above. More particularly, it is foreseen that a computer learning algorithm may be employed to personalize automated location interaction management based on a user's language and/or behavioral patterns and/or more broadly to improve automated location interaction management using data regarding one or more users.

For instance, the user mobile device may record data regarding which automatically-proposed associations between items and/or automatically-proposed PIL-types or PILs are actually implemented by the user. In an embodiment, the item-tracking application may be configured to automatically propose an optimal-efficiency shopping list to be addressed at a super department store, the list consisting of items aggregated from a number of disparate lists originally created by the user. The user mobile device may be configured to track the PILs at which the items on the super department store list are actually addressed by the user. The computer learning algorithm may be executed by the user mobile device and/or a remote coordination server to analyze the automatically-generated list against the actual user behavior data. The computer learning algorithm may thereby discern a pattern such as that the user avoids the super department store altogether during average trips to run errands or the user avoids purchasing items of a certain type at the super department store. The computer learning algorithm may thereby automatically adjust preferences metadata and/or taxonomic and/or ontological framework(s) relating to super department stores and/or implicated offerings thereof.

More broadly, the user mobile device may be configured to utilize the computer learning algorithm to learn how the user addresses items at PILs, and to adjust the item-tracking application's automated location interaction management processes accordingly. For example, the user mobile device may be configured to record data regarding the PILs or other means used by the user to address items. The computer learning algorithm may be executed by the user mobile device to thereby discern that "dinner reservations" are overwhelmingly made over the phone rather than at a PIL offering food around dinner time, that the user overwhelmingly prefers to bathe at a place of residence, that a reference to a brand name and a generic product description is actually intended to reference a specific product offering, that relationships within an ontological and/or semantic matching framework are incorrect or should be otherwise weighted, etc. The item-tracking application may be adjusted to reflect such pattern(s).

Moreover, the computer learning algorithm may be executed to discern other patterns in user behavior that may relate to addressing items, and to adjust the item-tracking application accordingly. For example, the computer learning algorithm may consume historical purchase and/or item deletion data to discern a pattern according to which the user always fills up on gas after using a vehicle to travel between three hundred (300) to four hundred (400) miles. Each time an item having core words describing the need to "get gas" is outstanding, and the item-tracking application has received data indicating travel of at least three hundred (300) miles since the last "get gas" item was addressed (and/or a gas purchase is evident from other historical data), the item-tracking application may provide a supplemental reminder (e.g., not necessarily triggered by a trigger algorithm based on passing within a geofence) that gas may be needed soon. The item-tracking application may also be configured to utilize patterns recognized in historical purchase data and/or item edits to automatically suggest item(s) to the user (e.g., to suggest a "get gas" item be added every three hundred (300) miles of travel in the user's vehicle).

In addition, the computer learning algorithm may detect patterns in the user behavior unrelated to purchases and/or item editing which may provide metadata useful to the item-tracking application's primary functions. For instance, the user may listen to a particular soundtrack when (and only when) he is preparing to go to the gym. The computer learning algorithm may receive data from one or more other application(s) executing on the user mobile device indicating whether the soundtrack is playing. The computer learning algorithm may be configured to adjust the item-tracking application so that each time the soundtrack is played, the item-tracking application assumes a certain route (to the gym) will be traveled in the near future, and may automatically determine new associations between items based on this assumption.

In an embodiment, the user mobile device may be configured to utilize the computer learning algorithm to improve an ontological framework and/or general catalog taxonomy. The user mobile device may be configured to record each time a user provides user input indicating that an automatically-determined selection from a framework and/or catalog is not representative of the item the user is attempting to define. The item-tracking application may be configured to receive historical purchase data linked to determinations that stored items have been addressed. Information such as that outlined herein may be consumed by the computer learning algorithm to discern patterns that help the item-tracking application relate the user's particular language patterns to the ontological framework and/or general catalog taxonomy.

For instance, where a "get HEINZ®" item is stored by the item-tracking application, and is deleted in connection with a purchase of ketchup of that brand (e.g., as shown by historical purchase data provided by a mobile shopping cart application), the computer-learning algorithm may recognize a user speech pattern and make an appropriate adjustment to the item-tracking application so that such future brand-name references are automatically linked specifically to ketchup of that brand.

In another example, portions of an ontological framework and/or catalog taxonomy may be adjusted based on the user's input and/or pattern of addressing items in connection therewith. An item may be matched against a PIL using a class defined within the framework and/or taxonomy. For instance, the item-tracking application and/or remote coordination server may automatically match "make dinner reservations" against a PIL that offers "child entertainment and gymnastic equipment; food available from noon to 5 p.m." because such products are categorized along the fringe of a "food services" class within the framework and/or taxonomy. Nonetheless, the computer learning algorithm may consume data recording user inputs rejecting and/or ignoring the automatically-matched child entertainment PIL for addressing the "make dinner reservations" item. The computer learning algorithm may thereby discern a pattern and adjust the framework and/or taxonomy so that the boundaries of the "food services" class are tightened to exclude fringe food providers such as PILs focusing primarily on child entertainment services. It is foreseen that a wide variety of adjustments may be made by observing a user (and other consumers') behavior and input without departing from the spirit of the present invention.

The user mobile device may also be configured to automatically make corresponding metadata entries, update an auto-complete database, adjust ontological and/or semantic matching framework(s), update automated organization/association processes and/or trigger algorithm(s), and the like in view of the pattern(s) discerned by the computer learning algorithm. One of ordinary skill will appreciate that the computer learning algorithm may be utilized to discern patterns of different type and/or based on observations involving more, less and/or different variables within the scope of the present invention.

The method 100 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

Exemplary Implementation

In an exemplary embodiment, a user may speak a keyphrase into a microphone of a mobile phone. The mobile phone may be configured to automatically convert the audio input into text. The mobile phone may also be configured to automatically recognize the keyphrase as one intended to open an item-tracking application of the user mobile device configured for automated location interaction management. The item-tracking application may be configured to compare a voice print of the audio input against a confirmed voice print of the user to authenticate the user's identity.

The user may provide additional input—e.g., in the form of audio input—at least partly defining and/or editing one or more items. In an embodiment, the user may make a shopping list for a store. The user may optionally designate a PIL for addressing the items on the list, for example by specifying one or more of: brand name, PIL-type, and location. The user may also provide permission to one or more third parties to edit the shopping list remotely, for example by transmitting such edits via text message, by other communication formatted by a similar copy of the item-tracking application residing on the third party's mobile device, and/or by other means. In an embodiment, the third party may request addition or deletion of one or more items from the list through generating a corresponding request at the third party's mobile device and transmitting same to the communication element of the user's device. Preferably, the user is provided with an option for managing permission(s) required for such editing by third party(ies). Moreover, the user mobile device may be configured to generate and display a notification to the user each time an item is edited by a third party.

The user may travel with the user mobile device to a location within a geofence of the specified PIL. The user's position within the geofence may be determined by address information regarding the PIL, geolocation data determined by a location determining element of the user mobile device, proximity to a beacon on-site at the PIL, and/or other mechanisms. A trigger algorithm of the item-tracking application may generate a trigger output based on the user's proximity to the PIL. The user mobile device may automatically generate and display an alert including data and information regarding the trigger output.

The user may travel to the PIL to address the items on the list. A mobile shopping cart application may optionally be utilized for tracking the user's progress in addressing the items on the list and/or providing navigational guidance to the user according to a layout of the PIL. The user may progress through the items on the list, receiving alerts each time he appears to be forgetting an item located in an area he is leaving. The user may be presented with the option of providing further clarifying user input regarding individual items—for example by selecting "skip" or "delete" in response to an alert specifying an item—without departing from the spirit of the present invention.

The method outlined above may include additional, less, or alternate actions, including those discussed elsewhere herein such as in the sections entitled "Exemplary System" and/or "Exemplary Computer-Implemented Method" and/or may be implemented via a computer system, communication network, one or more processors or servers, and/or computer-executable instructions stored on non-transitory storage media or computer readable medium.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

We claim:

1. A computer-implemented method for automated location interaction management, the computer-implemented method comprising:
    receiving and storing, via a mobile electronic device, user input at least partly defining an item of a plurality of items to be addressed by a user;
    automatically generating, via one or more processors, a geofence around a potential interaction location at least in part by expanding or contracting an area around the potential interaction location based on one or both of: (a) a number of the plurality of items expected to be addressable at the potential interaction location, and (b) an availability density metric for the scarcity of one or more of the plurality of items within a travel radius;
    automatically determining, via the one or more processors and based at least in part on a first geolocation of the mobile electronic device relative to the geofence, that a first location interaction trigger has occurred;
    automatically triggering, via the one or more processors, a first alert based on the first location interaction trigger for output by the mobile electronic device;
    automatically determining, via the one or more processors and based at least in part on a second geolocation of the mobile electronic device, that a second location interaction trigger for the item has occurred;
    automatically generating, based on the second location interaction trigger, a second alert describing the item; and
    automatically displaying the second alert on a display of the mobile electronic device,
        wherein determining the occurrence of the second location interaction trigger for the item includes, under a completion failure rule, automatically determining that a pre-determined action has not been taken in connection with the item and that indicators of departure from the potential interaction location have occurred.

2. The computer-implemented method of claim 1, wherein the potential interaction location is a storefront of a merchant.

3. The computer-implemented method of claim 1, wherein the potential interaction location is a mobile site and the geofence is in part determined by a geolocation of a mobile device registered in association with the mobile site.

4. The computer-implemented method of claim 1, wherein the item is partly defined in a memory of the mobile device by determining membership in a grouping of a pre-determined ontological framework, the membership determination being based upon at least one of: (A) additional input received from the user at the mobile device; and (B) automated analysis of the item via the mobile device.

5. The computer-implemented method of claim 4, wherein the item comprises a product to be purchased and the item is matched to the potential interaction location using inventory data for products offered for sale at the potential interaction location.

6. The computer-implemented method of claim 4, wherein the item comprises a location label and the item is matched to the potential interaction location using at least one of a (1) trade name and (2) a location type associated with the potential interaction location.

7. The computer-implemented method of claim 1, wherein determining that the first interaction location has occurred includes querying a semantic matching operator with the item and one or more words relating to the potential interaction location.

8. The computer-implemented method of claim 7, wherein the item comprises a product to be purchased and the item is matched to the potential interaction location using inventory data for products offered for sale at the potential interaction location.

9. The computer-implemented method of claim 7, wherein the item comprises a location label and the item is matched to the potential interaction location using at least one of a (1) trade name and (2) a location type associated with the potential interaction location.

10. The computer-implemented method of claim 1, wherein generating the geofence includes
    determining a route to be traveled by the mobile electronic device, the route comprising a plurality of future geolocations of the mobile electronic device;
    generating the geofence in part based on determining that the potential interaction location is within a travel radius of one or more of the plurality of future geolocations.

11. The computer-implemented method of claim 1, wherein generating the geofence is based at least in part on the availability density metric calculated at least in part by
    identifying a set of locations within the travel radius;
    identifying other potential interaction locations of the set of locations that have profiles that match the item;
    determining geolocations for the potential interaction location and the other potential interaction locations;
    calculating the availability density metric for the item based at least in part on the geolocations of the potential interaction location and the other potential interaction locations.

12. The computer-implemented method of claim 1, wherein the user input comprises audio input received via a microphone of the mobile electronic device and converted to text embodying at least part of the item.

13. The computer-implemented method of claim 12, further comprising identification of a keyphrase to initiate receipt of the user input comprising—
    receiving initial user input including audio input received via the microphone and converted to text;
    automatically determining that the initial user input includes one or more predetermined words comprising the keyphrase to initiate receipt of the user input.

14. The computer-implemented method of claim 13, further comprising authentication of a user providing the initial user input comprising—
    automatically generating a voice print of the initial user input;

automatically comparing the voice print against a verified voice print of the user.

15. The computer-implemented method of claim 1, further comprising automatically editing the item in response to information received via a communication element of the mobile electronic device.

16. The computer-implemented method of claim 15, wherein the information received includes a message from a mobile shopping cart identifying the item.

17. The computer-implemented method of claim 16, wherein the message indicates that the item has been scanned into the mobile shopping cart via the mobile electronic device.

18. The computer-implemented method of claim 1, further comprising—
   determining a location of at least a portion of the item at the potential interaction location;
   displaying the location on a display of the mobile electronic device.

* * * * *